United States Patent [19]
Graham

[11] 4,005,247
[45] Jan. 25, 1977

[54] PRESSURE SENSITIVE ADHESIVE COMPOSITIONS
[75] Inventor: Curtis Michael Graham, Columbus, Ohio
[73] Assignee: Ashland Oil, Inc., Ashland, Ky.
[22] Filed: Oct. 30, 1975
[21] Appl. No.: 627,165
[52] U.S. Cl. .................. 526/15; 428/355; 428/356; 526/16; 526/47; 526/48
[51] Int. Cl.² ............................. C08F 8/42
[58] Field of Search ............ 526/15, 16, 47, 48; 428/356

[56] References Cited
UNITED STATES PATENTS 3,740,366  6/1973  Sanderson et al. .......... 260/29.6 M
3,769,254  10/1973  Anderson et al. .......... 260/33.4 PQ

*Primary Examiner*—John Kight, III

[57] ABSTRACT

Pressure-sensitive adhesives having improved cohesive strength are obtained by reacting an acrylic interpolymer containing an interpolymerized acrylic monomer containing an ethylenically unsaturated carboxylic acid anhydride with a metal alkoxide, chelated metal alkoxides such as chelated titanium esters being particularly preferred. Adhesives produced in this manner have improved cohesive strength on backings while maintaining good tack and adhesive properties.

23 Claims, No Drawings

PRESSURE SENSITIVE ADHESIVE COMPOSITIONS

BACKGROUND OF THE INVENTION

Pressure-sensitive adhesives, which are normally tacky materials adherent upon application of light pressure, are desirable in a number of industrial applications because they can be used with various materials and are easily adapted to production line techniques. In order to function satisfactorily as a pressure-sensitive adhesive, a composition must provide a combination of properties including good tack, adhesion and cohesive strength, and must adhere instantaneously when applied to substrates of differing surface characteristics. To be useful in many industrial applications, the bond obtained by the use of the adhesive must have sufficient strength to remain firm over relatively long periods and under different and sometimes severe environment conditions.

Most pressure-sensitive adhesives, however, have low relative strength as compared, for instance, to thermosetting resin adhesives, because the desired tack and adhesive properties are ordinarily inconsistent with the high level of cohesive strength obtained with other types of thermosetting resin adhesive polymers. Because of this, attempts to provide pressure-sensitive adhesives having improved cohesive strength have not proven satisfactory, with continuing problems being the tendency of the adhesive to lose strength upon aging and the unsatisfactorily low tack and adhesion which tend to be found with higher strength adhesives of this type.

SUMMARY OF THE INVENTION

The adhesive compositons of the present invention comprise an adhesive polymer formed by the reaction of a metal alkoxide with an interpolymer formed from monomers consisting essentially of (1) at least 40 percent by weight of one or more alkyl acrylates, and (2) at least 0.2 percent by weight of an $\alpha - \beta$ unsaturated acid anhydride. Optional components of the adhesive polymer include other monomers containing an additional copolymerizable ethylenically unsaturated linkage as the only reactive functional group. The preferred metal alkoxides are titanic acid esters and more preferably chelated esters, and it is also particularly preferred that the composition contain a substantial amount of substantially anhydrous alcohol in the solvent in which it is dissolved because of the stabilizing effects of alcohols such as isopropyl alcohol and the like.

The adhesive compositions described herein form dry films or adhesive layers having high cohesive strength, while at the same time retaining good tack and adhesion, and can impart excellent shear strength and shrink resistance to various backing members including any of the various flexible and non-flexible materials with which pressure-sensitive adhesives are desirably employed. They also can be used to produce free films which can be applied in a transfer operation.

DETAILED DESCRIPTION OF THE INVENTION

The adhesive compositions of the invention comprise an adhesive polymer formed by the reaction of an acrylic interpolymer with a metal alkoxide. The acrylic interpolymer is formed of monomers consisting essentially of one or more alkyl acrylates, generally containing up to about 10 carbon atoms in the alkyl group, along with a small proportion of an $\alpha - \beta$ unsaturated anhydryde such as maleic and itaconic anhydride. The polymer also may include one or more other addition copolymerizable monomers devoid of any functional group except for the polymerizable ethylenic linkage.

The alkyl acrylates which form a major essential constituent of the interpolymer are preferably acrylic acid esters of alcohols having up to about 18 carbon atoms. The preferred alkyl acrylates have an average of from about 4 to about 10 carbon atoms in the alkyl groups, and include butyl acrylate, amyl acrylate, hexyl acrylate, heptyl acrylate, octyl acrylate, nonyl acrylate, decyl acrylate, and various isomers of these acrylates, such as isooctyl acrylate. One specific preferred alkyl acrylate for use in the invention is 2-ethylhexyl acrylate. Higher alkyl acrylates can in some instances be used, particularly in combination with the lower alkyl acrylates, whereby the average number of carbon atoms in the alkyl groups is within the desired range.

In most cases it is necessary to have at least about 40 percent by weight of the interpolymer consist of the above alkyl acrylates, having an average of from about 4 to about 10 carbon atoms in the alkyl group and in many preferred interpolymers, 60 percent or more are made up of these monomers.

The interpolymer also includes a small amount (from about 0.2 to 20 weight percent) of an $\alpha - \beta$ unsaturated acid anhydride which contains no reactive hydrogen atoms. The preferred anhydride is maleic anhydride, but others such as itaconic anhydride are also suitable.

There can also be included in the adhesive up to about 59.8 percent by weight of one or more other addition copolymerizable monomers which contain an ethylenically unsaturated linkage, such linkage being the only reactive functional group in the monomer. For example, there is often included a vinyl ester of a saturated carboxylic acid, such as vinyl acetate, vinyl propionate or vinyl butyrate. Other optional monomers which will copolymerize by addition reaction that can be employed include alkyl acrylates other than those above, and alkyl methacrylates having from 1 to 20 carbon atoms or more in the alkyl group, such as methyl methacrylate, butyl methacrylate, octadecyl methacrylate lauryl methacrylate, and the like.

It will be recognized that the combination of monomers used to make up the interpolymer will be such as to provide a normally tacky pressure-sensitive material. Thus, within the skill of the art, the interpolymer can include essentially any ethylenic monomer or mixture of monomers copolymerizable with the other components and which do not contain additional reactive functional groups and which do not, in combination with those components, provide unsatisfactory properties such as unsatisfactorily reduced tack. The term "reactive functional groups" herein refers to functional groups with which the metal alkyoxide reacts, such as hydroxyl, carboxyl, etc. Such other monomers can be of widely varying types, depending upon the specific alkyl acrylates, hydroxyalkyl esters, carboxylic acids, and other monomers in the interpolymer. For instance, there can be utilized in certain cases monoolefinic hydrocarbons, such as styrene and vinyl toluene; halogenated monoolefinic hydrocarbons, such as vinyl chloride and vinylidene chloride; unsaturated esters, such as isopropenyl acetate and dimethyl maleate; and dienes, such as 1,3-butadiene.

As indicated above, the interpolymers herein are normally tacky and the composition of the interpolymer is chosen in accordance with known practice so as to provide a product of suitable tack. Tack is normally inversely related to the plasticity of the polymer, which is a measure of the deformability of the polymer under an applied load.

The interpolymer, as described above, is reacted with a metal alkoxide to provide the adhesive polymer employed in the invention.

The metal alkoxides which may be used herein may be any metal alkoxide such as those having the formula $R_nT(OR_1)_z$, wherein T is a metal selected from the group consisting of Groups II, III, IV and V of the Periodic Table; R is selected from the group consisting of alkyl radicals of from 1 to 8 carbon atoms such as methyl, ethyl butyl, iso-octyl and the like and aryl radicals of from 6 to 16 carbon atoms such as benzyl. $R_1$ is selected from the group consisting of aliphatic and substituted aliphatic radicals containing from 1 to 18 carbon atoms such as benzyl. $R_1$ is selected from the group consisting of aliphatic and substituted aliphatic radicals containing from 1 to 18 carbon atoms, such as alkyl groups, allyl groups and the like; $n$ is an integer whose value is zero or greater and $z$ is an integer of at least 2, wherein the sum of $n + z$ is greater than 1 and is equal to the valence of the metal represented by T.

Examples of metal alkoxides for use in the practice of this invention include the following: magnesium ethoxide, calcium ethoxide, strontium ethoxide, barium ethoxide, aluminum ethoxide, aluminum isopropoxide, lanthanum t-butoxide, ferric ethoxide, ferric isopropoxide, titanium ethoxide, titanium isopropoxide, titanium butoxide, cupric isopropoxide, cobaltic isopropoxide, zinc isopropoxide, nickel isopropoxide, zirconium ethoxide, zirconium isopropoxide, zirconium butoxide, hafnium ethoxide, hafnium isopropoxide, cerium isopropoxide, germanium isopropoxide, stannic ethoxide, stannic isopropoxide, vanadium isopropoxide, chromium t-butoxide, niobium ethoxide, niobium isopropoxide; also included are double alkoxides such as sodium zirconium isopropoxide, potassium zirconium ethoxide, magnesium aluminum ethoxide, potassium aluminum butoxide, sodium stannic ethoxide and alkyl metal alkoxides such as diethoxy ethyl aluminum, dibutoxy diphenyl titanium, phenyl triisopropoxy titanium, dimethyl diisopropoxy titanium, dibutyl dimethoxy tin and the like.

The preferred metal alkoxides are aluminum isopropoxide or titanium esters such as alkyl titanates such as ortho titanic acid esters of monofunctional alcohols and tetraaryl esters. Examples of alkyl titanates include tetramethyl titanate, tetraethyl titanate, tetrapropyl titanate, tetraisopropyl titanate, tetrabutyl titanate, tetra-2-ethyl-hexyl titanate, and tetrastearyl titanate. As indicated, tetraphenyl titanate and other tetraaryl esters are also included. It has been found that the adhesives produced using these alkoxides and the acid anhydrides have excellent strength.

The metal alkoxides, including the lower alkyl titanates, have the disadvantage of being extremely reactive and have a tendency to gel in combination with the acrylic interpolymer. This tendency limits the ability to store the formulated adhesive for any appreciable period. While this tendency can be minimized to some extent by proper choice of the components of the interpolymer and the level of titanate ester utilized, it has been found that a chelated metal alkoxide unexpectedly will solve any stability problems while retaining the strength. It has been found that the chelated esters are not subject to the storage disadvantage and provide formulated adhesives which can be stored for relatively long periods without substantial increase in viscosity.

The chelated titanium esters which are employed in the preferred embodiment of the invention are formed by coordinate bonding between titanium and electron-donating atoms, such as oxygen or nitrogen. The preparation of such chelated esters is described in U.S. Pat. Nos. 2,453,520, 2,468,916, 2,870,181 and 2,824,114 and in British Pat. No. 74,113. The preferred chelated estes employed in the invention are those which are commercially available, which include those formed from octylene glycol, triethanolamine, 2,4-pentanedione, and lactic acid. Thus completely chelated esters such as titanium acetylacetonate, when added to the interpolymer solution forms a more stable, latently crosslinkable solution, which upon evaporation of solvent forms crosslinked polymer matrix.

It is noted that the chelating agent such as the glycol, hydroxy acid, keto ester, or aminoalcohol may also be added to the composition as an excess to achieve better stability. Small excesses (based on polymer solids) of the chelating agents have been found to be extraordinarily effective. The chelating agent may be added directly to the composition or it may be added to the metal alkoxide. The mechanism for the increased stability due to the presence of excess chelating agent is not understood.

The relative proportions of acrylic interpolymer and metal alkoxide employed in producing the adhesive polymers of the invention can be varied and depend to some extent upon the nature of the interpolymer and the particular metal alkoxide or chelated metal alkoxide utilized. In most cases, however, there is employed from about 0.05 percent to about 5 percent by weight of the metal alkoxide or chelated metal alkoxide based on the total polymer.

The reaction between the metal alkoxide or chelated metal alkoxide and the acrylic interpolymer does not require special conditions. Ordinarily, the reaction takes place upon coating and drying the mixture at moderate temperatures, such as 50° C. to 150° C.; higher or lower temperatures can be used, depending upon the desired reaction time.

The adhesive composition is essentially composed of the adhesive polymer, described above, in an organic solvent. In order to provide maximum storage stability, it is important that the solvent contain a substantial proportion, e.g., at least about 20 percent by weight, of an alcohol. Any liquid alcohol of suitable volatility can be employed, although lower alkanols, such as ethanol, propanol, isopropanol and butanol, are preferred. Other alcohol solvents that can be utilized include methyl Cellosolve, butyl Cellosolve, diacetone alcohol, and the like. The remainder of the solvent can be any of the organic materials ordinarily utilized for this purpose and in which the interpolymer is soluble or dispersible, including esters, ketones, hydrocarbons, etc. Other aliphatic hydrocarbon solvents, such as heptane may be included as they permit the coating of the adhesive directly onto solvent sensitive backings with facility and they dry quickly. It is also preferably that as little water be present as possible as the water hydrolizes and deactivates the metal alkoxide.

There can also be included in the adhesive composition additive materials which do not affect the basic properties of the adhesive. Fillers, tackifiers, antioxidants, stabilizers, and the like are thus sometimes added to the formulated adhesive.

The adhesive can be employed in various forms. For instance, it can be cast as a free film interleaved between sheets of release paper and employed in a transfer operation. In other methods of utilization, the adhesive is coated onto a backing member and dried to provide pressure-sensitive adhesive coated materials, such as tapes, sheets or panels. Alternatively the adhesive may be coated on to a release material and then dried and transferred to a backing member. Cellophane, vinyls, cloth, Mylar, rubber, various laminates, and other such flexible materials, as well as wood, metal, hardboard and other less flexible backings, can be coated in this manner. The adhesives of this invention may also be used for decorative coatings, outdoor decals, and signs. In some cases, the adhesive can be used as a liquid adhesive and applied just prior to use.

In any event, the dried adhesive composition forms a tacky adhesive which adheres to various substrates to provide a bond of high cohesive strength, thus making these adhesives especially desirable in uses where holding ability and retention of strength over a period of time are necessary.

EXAMPLE 1

PREPARATION OF ADHESIVE

A reactor was charged with 4.8 parts (by weight) of ethyl acrylate, 18.9 parts of 2-ethylhexyl acrylate, 5.7 parts of vinyl acetate, 2.1 parts of maleic anhydride, 21.6 parts of ethyl acetate and 0.03 parts of benzoyl peroxide. The resulting mixture was heated to reflux and held at reflux until a sample (50 gm from reactor diluted with 50 gm toluene) gave a viscosity of 10–12 stokes. When this viscosity was reached, .03 parts of benzoyl peroxide; 3.6 parts of ethyl acetate and 5.3 parts of toluene were added. Reflux was continued until a diluted viscosity (50 gms from reactor diluted with 50 gm toluene) gave a viscosity of 8–10 stokes, at that point 6.6 parts of isopropanol, 6.6 parts of methylene chloride and 0.03 parts of benzoyl peroxide were added and reflux continued. When conversion of monomer to polymer was greater than 95% (as determined by evaporation), the reaction mixture was thinned with 23.2 parts of isoproponal. The reaction mixture was cooled and a mixture of Tyzor AA (0.1 parts) and 2–4 pentandione (0.9 parts) was added at room temperature. The reaction mixture had the following physical constants; Non Volatile = 30.5%; Viscosity = 26 stokes.

Examples 2, 3 and 4 were prepared following the procedure of Example 1, using ratios of reactant as shown in Table I. The control corresponds to a standard commercial pressure sensitive adhesive formulation to which Tyzor AA was added for comparison purposes.

TABLE I

|  | EA[1] | 2EHA[2] | VA[3] | MA[4] | AA[5] | Metal Chelate[6] |
|---|---|---|---|---|---|---|
| Control | 16.1 | 62.8 | 19 | 0 | 2.1 | 0.33 |
| 1 | 15.3 | 59.8 | 18.2 | 6.7 | 0 | 0.33 |
| 2 | 5 | 70 | 18.3 | 6.7 | 0 | 0.33 |
| 3 | 5.2 | 72.5 | 18.9 | 3.4 | 0 | 0.33 |
| 4 | 5.1 | 71.2 | 18.6 | 5.1 | 0 | 0.33 |

[1]Ethyl Acrylate
[2]2-Ethyl Hexyl Acrylate
[3]Vinyl Acetate
[4]Maleic Anhydride
[5]Acrylic Acid
[6]Tyzor AA obtained from E. I. duPont

Evaluation as Pressure Sensitive Adhesive

The adhesives were evaluated on Mylar (duPont) backing. Ten mil wet films were applied to the Mylar and separate samples were cured for 1 hour at room temperature and for 2 minutes at 200° F. Table II shows adhesive data obtained from samples cured for 2 minutes at 200° F., while Table III gives data for samples cured at room temperature. The tests which generated the data in Table II and III are:

| 1. | Quick Stick | Pressure Sensitive Tape Council Test (PSTC) - 5 |
|---|---|---|
| 2. | Shear Adhesion | PSTC-7 with modifications where the area of the adhesive applied to the metal was ½" × ½" instead of 1" × 1". The time for the tape to separate from the metal is recorded in hours. The weight applied is 1000 gm. |
| 3. | 50° C Creep | Same as Shear Adhesion except weight is reduced to 250 gms. and temperature was increased from 25° C to 50° C. |
| 4. | Peel Adhesion | Similar to PSTC-1 except the dwell time is 15 minutes. An overnight peel adhesion is also reported after a dwell time of 24 hours. |
| 5. | Plasticity | ASTM D 926-67. Tests run at 100° F. for 15 minutes. |
| 6. | Solvent Resistance | Cured films were placed in a mixture of 3 parts Heptane to 1 part Toluene for 5 minutes. The attack of the adhesive by the solvent is then measured. |

No attack - Excellent
Swelling (not dissolved) - Good
Dissolved - Poor

TABLE II

|  | Quick Stick[1] | Shear[2] | 50° C. Creep | Peel Adhesion Initial | Peel Adhesion Overnight | Plasticity | Solvent Resistance[6] |
|---|---|---|---|---|---|---|---|
| Control | 1.1 lbs. | 2.5 hrs. | >72 hrs. | 43 oz. | 48 oz. | 2.66 | Fair |
| 1 | 0–1.0 | >72 | >72 | 68 | 103 | 3.0 | Very good |
| 2 | 0–1.5 | >72 | >72 | 72 | 104 | 2.92 | V.G. to Ex. |
| 3 | 0–1.2 | 12.7 | >72 | 72 | 63 | 2.87 | Fair |

TABLE II-continued

| | Quick Stick[1] | Shear[2] | 50° C. Creep | Peel Adhesion Initial | Peel Adhesion Overnight | Plasticity | Solvent Resistance[6] |
|---|---|---|---|---|---|---|---|
| 4 | 0.9–1.0 | 30 | >72 | 50 | 74 | 2.78 | Fair |

TABLE III

| | Quick Stick | Shear | 50° C. Creep | Peel Adhesion Initial | Peel Adhesion Overnight | Williams Plasticity | Solvent Resistance |
|---|---|---|---|---|---|---|---|
| Control | 0.8–0.9 lbs. | 3.2 hrs. | >72 hrs. | 45 oz. | 49 oz. | 2.33 | Poor |
| | 0–1.1 | >72 | >72 | 67 | 92 | 2.71 | Good |
| | 0–1.5 | >72 | >72 | 75 | 12 | 2.13 | V.G. to Ex. |
| | 0.7–0.9 | >20.5 | >72 | 40 | 58 | 2.46 | Fair |
| | 1.0–1.2 | >59.6 | >72 | 53 | 70 | 2.52 | Fair |

Table II compares performance of the various compositions versus the control, and especially shows the effect of various levels of maleic anhydride on performance. The data shown in Table III indicates the same relative performance of the compositions is obtained at room temperature as at 200° F. Room temperature cure for longer than 1 hour merely gave adhesive values more closely approaching the values found in Table II.

Although specific examples of the invention have been set forth hereinabove, it is not intended that the invention be limited solely thereto, but to include all the variations and modifications within the scope of the appended claims.

What is claimed is:

1. A pressure-sensitive adhesive composition which when dry forms a tacky adhesive of high cohesive strength, said composition comprising an adhesive polymer formed by the reaction of
   A. a normally tacky interpolymer of monomers consisting essentially
      1. at least 40 percent by weight of one or more alkyl acrylates having up to about 18 carbon atoms in the alkyl group,
      2. at least about 0.2% of an $\alpha - \beta$ unsaturated acid anhydride
      3. up to about 59.8 percent of one or more copolymerizable monomers containing an ethylenically unsaturated linkage as the only reaction functional group, said copolymerizable monomers having no more than 25 carbon atoms in the molecule; and
   B. a metal alkoxide having the formula $R_nT(OR_1)_z$ wherein T is a metal selected from the group consisting of Groups II, III, IV, and V of the Periodic Table, R is selected from the group consisting of alkyl radicals of from 1 to 8 carbon atoms and aryl radicals of from 6 to 16 carbon atoms, $R_1$ is selected from the group consisting of aliphatic and substituted aliphatic radicals containing from 1 to 18 carbon atoms, n is an integer whose value is 0 or greater and z is an integer whose value is at least 2 wherein the sum of $n + z$ is greater than 1 and is equal to the valence of the metal represented by T.

2. The adhesive composition of claim 1 in which said chelated metal alkoxide is a chelated ester of titanic acid.

3. The adhesive composition of claim 1 in which said adhesive polymer is dissolved in liquid organic solvent comprising at least about 20 percent by weight of one or more substantially anhydrous alcohols.

4. The adhesive composition of clain 1 in which said alkyl acrylates have an average of from about 4 to about 10 carbon atoms in the alkyl groups.

5. The adhesive composition of claim 1 in which said interpolymer contains from about 10 to about 59.8 percent by weight of a vinyl ester of a saturated monocarboxylic acid.

6. The adhesive composition of claim 1 in which said interpolymer contains from about 0.2 to about 20 percent by weight of $\alpha - \beta$ unsaturated acid anhydride.

7. The adhesive composition of claim 1 in which the chelated metal alkoxide is present in an amount between about 0.05 and about 5.0 percent of the total weight of the interpolymer and the chelated metal alkoxide.

8. The adhesive composition of claim 1 wherein the chelated metal alkoxide is a chelated titanium acetonate.

9. The adhesive composition of claim 1 comprising excess chelating agent.

10. A pressure-sensitive adhesive composition which when dry forms a tacky adhesive of high cohesive strength, said composition comprising an adhesive polymer formed by the reaction of
   A. A normally tacky interpolymer of monomers consisting essentially of
      1. at least about 40 percent by weight of one or more alkyl acrylates having an average of from about 4 to about 10 carbon atoms in the alkyl groups,
      2. from about 0.2% to about 20% by weight of $\alpha - \beta$ unsaturated acid anhydride,
      3. up to about 59.8 percent by weight of one or more copolymerizable monomers containing an ethylenically unsaturated linkage as the only reactive functional group, said copolymerizable monomers having no more than 25 carbon atoms in the molecule; and
   B. a metal alkoxide having the formula $R_nT(OR_1)_z$ wherein T is a metal selected from the group consisting of Groups II, III IV, and V of the Periodic Table, R is selected from the group consisting of alkyl radicals of from 1 to 8 carbon atoms and aryl radicals of from 6 to 16 carbon atoms, $R_1$ is selected from the group consisting of aliphatic and substituted aliphatic radicals containing from 1 to 18 carbon atoms, n is an integer whose value is 0 or greater and z is an integer whose value is at least 2 wherein the sum of $n + z$ is greater than 1 and is equal to the valence of the metal represented by T.

11. The adhesive composition of claim 10 in which said adhesive polymer is dissolved in liquid organic solvent comprising at least about 20 percent by weight of one or more substantially anhydrous alcohols.

12. The adhesive composition of claim 11 in which said alcohol is a lower alkanol.

13. The adhesive compositon of claim 10 in which said interpolymer contains from about 0.2 to about 20 percent by weight of $\alpha - \beta$ ethylenically unsaturated acid anhydride.

14. The adhesive composition of claim 13 in which said acid anhydride is maleic.

15. The adhesive composition of claim 10 in which said interpolymer contains from about 10 to about 59.8 percent by weight of a vinyl ester of a saturated monocarboxylic acid.

16. The adhesive composition of claim 10 in which said metal alkoxide is present in an amount between about 0.05 and about 5 percent of the total weight of the interpolymer and the metal alkoxide.

17. The adhesive composition of claim 10 wherein the metal alkoxide is an organic ester of titanic acid.

18. The adhesive composition of claim 10 wherein the metal alkoxide is a chelated metal alkoxide.

19. The adhesive composition of claim 18 additionally comprising a chelating agent.

20. A pressure-sensitive adhesive coated article comprising a backing member having thereon a layer of the adhesive composition of claim 1.

21. A pressure-sensitive adhesive coated article comprising a backing member having thereon a layer of the adhesive composition of claim 10.

22. A pressure-sensitive film adhesive comprising a dried film of the adhesive composition of claim 1.

23. A pressure-sensitive film adhesive comprising a dried film of the adhesive composition of claim 10.

* * * * *